United States Patent
Kerr et al.

(10) Patent No.: US 7,940,773 B2
(45) Date of Patent: May 10, 2011

(54) SYSTEM, METHOD AND APPARATUS FOR AUTOMATED ATM TO ETHERNET PROVISIONING

(75) Inventors: Jade Kerr, Kansas City, MO (US); Steve Robertson, Overland Park, KS (US); Clinton J. Smoyer, Raymore, MO (US); Chad Collins, Eudora, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 181 days.

(21) Appl. No.: 12/009,384

(22) Filed: Jan. 18, 2008

(65) Prior Publication Data

US 2009/0185564 A1   Jul. 23, 2009

(51) Int. Cl.
*H04L 12/28* (2006.01)
*H04L 12/56* (2006.01)

(52) U.S. Cl. ............. 370/395.1; 370/395.3; 370/395.51; 370/395.53; 370/397

(58) Field of Classification Search .................. 370/352, 370/353, 356, 386, 395.1, 397, 395.3, 395.51, 370/395.53
See application file for complete search history.

(56) References Cited

U.S. PATENT DOCUMENTS

| | | | | |
|---|---|---|---|---|
| 6,345,051 B1* | 2/2002 | Gupta et al. | ............ | 370/395.2 |
| 7,079,540 B1* | 7/2006 | Wilson et al. | ............ | 370/395.3 |
| 7,152,117 B1* | 12/2006 | Stapp et al. | ............ | 709/245 |
| 7,639,696 B2* | 12/2009 | Wu | ............ | 370/395.53 |
| 2001/0030977 A1* | 10/2001 | May | ............ | 370/475 |
| 2004/0230695 A1* | 11/2004 | Anschutz et al. | ............ | 709/232 |
| 2005/0013301 A1* | 1/2005 | Bouchat et al. | ............ | 370/395.5 |
| 2005/0226215 A1* | 10/2005 | DelRegno et al. | ............ | 370/351 |
| 2006/0159008 A1* | 7/2006 | Sridhar et al. | ............ | 370/216 |
| 2006/0165086 A1* | 7/2006 | Wilson et al. | ............ | 370/395.2 |
| 2006/0245435 A1* | 11/2006 | Sajassi | ............ | 370/395.53 |
| 2006/0245439 A1* | 11/2006 | Sajassi | ............ | 370/400 |
| 2007/0076607 A1* | 4/2007 | Voit et al. | ............ | 370/230 |
| 2007/0153799 A1* | 7/2007 | Sorrini et al. | ............ | 370/395.1 |
| 2007/0171912 A1* | 7/2007 | Mitsumori | ............ | 370/395.1 |
| 2007/0204330 A1* | 8/2007 | Townsley et al. | ............ | 726/4 |
| 2007/0280267 A1* | 12/2007 | Ould-Brahim | ............ | 370/395.53 |
| 2007/0286207 A1* | 12/2007 | Almalki et al. | ............ | 370/395.52 |
| 2007/0299987 A1* | 12/2007 | Parker et al. | ............ | 709/246 |
| 2008/0151906 A1* | 6/2008 | Kolli et al. | ............ | 370/395.31 |
| 2009/0067437 A1* | 3/2009 | Krishnan | ............ | 370/395.53 |
| 2009/0185564 A1* | 7/2009 | Kerr et al. | ............ | 370/392 |

* cited by examiner

*Primary Examiner* — Aung S Moe
*Assistant Examiner* — Benjamin Elliott
(74) *Attorney, Agent, or Firm* — SNR Denton US LLP

(57) ABSTRACT

A system, method, and apparatus for network service provisioning includes receiving a network address request from a subscriber device. The network address request includes at least one data cell including a channel identifier associated with the subscriber device. The channel identifier identifies the subscriber device for a cell-switched network The method further includes determining the channel identifier from the network address request, and generating a customer tag using the channel identifier. The customer tag identifies the subscriber device for a packet-switched network The method further includes storing the channel identifier and the customer tag in a provisioning table for use in provisioning the subscriber device for the packet-switched network

18 Claims, 4 Drawing Sheets

SYSTEM, METHOD AND APPARATUS FOR AUTOMATED ATM TO ETHERNET PROVISIONING

BACKGROUND

Various devices exist today that are able to convert Asynchronous Transfer Mode (ATM) traffic to Ethernet traffic. However, theses devices require manual provisioning. During provisioning, telecommunications lines, circuits and equipment are configured to operate with customer equipment so as to provide a product and/or service to a customer. The requirement for manual provisioning of each existing, and all new circuits, makes this a daunting and unrealistic task, in particular for large-scale network changes. For example, the current method of manual provisioning does not scale to a 1,000,000+ line DSL network for transformation onto an Ethernet backbone.

Migration of ATM DSLAMs to an Ethernet backbone with existing approaches to provisioning requires the introduction of another provisioning point in the form of an additional device in which the ATM to Ethernet conversion takes place. To address the provisioning challenge through a change in processes or back-office systems is costly in terms of development and training.

SUMMARY

Embodiments of the present invention provide for a method, system and apparatus for automated ATM to Ethernet provisioning. The automated provisioning allows a subscriber device to communicate with a packet-switched network as well as a cell-switched network.

A method for network service provisioning includes receiving a network address request from a subscriber device. The network address request includes at least one data cell including a channel identifier associated with the subscriber device. The channel identifier identifies the subscriber device for a cell-switched network The method further includes determining the channel identifier from the network address request, and generating a customer tag using the channel identifier. The customer tag identifies the subscriber device for a packet-switched network The method further includes storing the channel identifier and the customer tag in a provisioning table for use in provisioning the subscriber device for the packet-switched network An apparatus for network service provisioning includes: at least one processor, and at least one memory device for storing a provisioning table. The processor(s) may be configured to receive a network address request from a subscriber device. The network address request includes at least one data cell including a channel identifier associated with the subscriber device. The channel identifier identifies the subscriber device for a cell-switched network The processor(s) may be further configured to determine the channel identifier from the network address request, and generate a customer tag using the channel identifier. The customer tag identifies the subscriber device for a packet-switched network The processor(s) may further be configured to store the channel identifier and the customer tag in the provisioning table for use in provisioning the subscriber device for the packet-switched network A computer usable program product in a computer readable medium storing computer executable instructions for network service provisioning is provided that, when executed, cause at least one processor to receive a network address request from a subscriber device. The network address request comprises at least one data cell including a channel identifier associated with the subscriber device. The channel identifier identifies the subscriber device for a cell-switched network. The computer executable instructions further cause the at least one processor to determine the channel identifier from the network address request, and generate a customer tag using the channel identifier. The customer tag identifies the subscriber device for a packet-switched network The computer executable instructions further cause the at least one processor to store the channel identifier and the customer tag in a provisioning table for use in provisioning the subscriber device for the packet-switched network.

DETAILED DESCRIPTION OF THE DRAWINGS

Embodiments of the invention solve the problem of ATM to Ethernet migration in a large network Various embodiments all service providers to retain their ATM access assets, such as Digital Subscriber Line Access Multiplexers (DSLAMs), while leveraging the cost efficiency and scalability of an Ethernet backbone network This is particularly useful for service providers having a large portion of DSL lines on an ATM backbone. Embodiments of the invention allow continued support of embedded ATM DSLAMs, while allowing capping of the ATM backbone network Embodiments of the invention enable interconnectivity between ATM based network access elements and Ethernet backbone networks through automated provisioning of network services. A virtual path identifier (VPI) identifies a particular virtual circuit path in an ATM network Each virtual path is divided into multiple virtual channels. A virtual channel identifier (VCI) identifies a particular virtual channel. The VPI and VCI are transmitted within the ATM network in a header portion of an ATM cell. A service tag (S-tag) is used to identify a particular service in an Ethernet network and a customer tag (C-tag) is used to identify a particular customer of the particular service. The S-tag and C-tag are transmitted within a header portion of an Ethernet frame. In various embodiments, an intelligent transitional device is provided that is aware when new VCI circuits built on VPI interfaces are introduced and appropriately switches traffic from those circuits to either an Ethernet interface or to another ATM interface based on behavior parameters set in the device. In some embodiments, the behavior parameters are set by a user of the device. This enables the turn up of new VCIs within a VPI and allows for switching traffic to an Ethernet interface with stacked S-tag/C-tag virtual local area networks (VLANs) through automatic provisioning of network services. Various embodiments provide for a transitional device that enables the conversion of ATM digital subscriber line (DSL) traffic onto an Ethernet network without requiring manual provisioning of the transitional device each time a new subscriber is activated.

Figure 1:
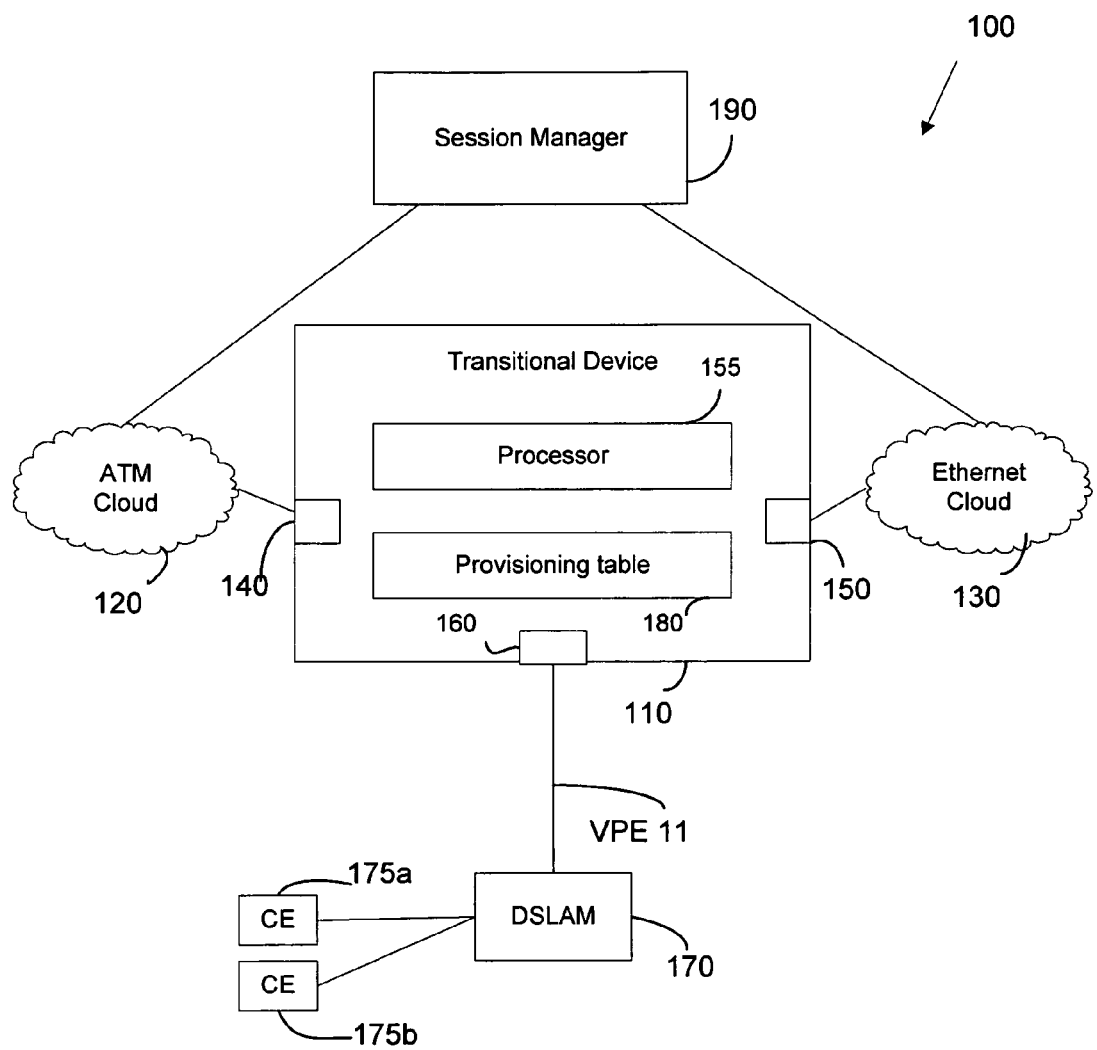
FIG. 1 is a system for automated ATM to Ethernet provisioning in accordance with one embodiment.

FIG. 1 is a system 100 for automated ATM to Ethernet provisioning in accordance with one embodiment. The system 100 includes a transitional device 110 coupled between an ATM cloud 120 and an Ethernet cloud 130. In a particular embodiment, the transitional device 110 includes at least one processor 155 for executing instructions operable to perform the various operations of the transitional device 110 described herein. The ATM cloud 120 is representative of an ATM network that includes ATM switches, ATM network segments, and other ATM devices and structure. The Ethernet cloud 130 is representative of an Ethernet network that includes Ethernet switches, Ethernet network segments, and other Ethernet devices and structure. The transitional device includes an ATM egress port 140 coupling the transitional device 110 to the ATM cloud 120, and an Ethernet egress port 150 coupling the transitional device 110 to the Ethernet cloud 130. The transitional device 110 further includes an ATM interface port 160 coupling a Digital Subscriber Line Access Multiplexer (DSLAM) 170 to the transitional device. The DSLAM 170 is a network device that connects one or more customer Digital Subscriber Lines (DSLs) to the ATM cloud 120 and/or the Ethernet cloud 130. In a particular embodiment, the DSLAM 170 is located close to the customer premises. In other embodiments, the DSLAM 170 may be located at a central office of a service provider. In a particular embodiment, the DSLAM 170 is coupled to customer equipment 175a and 175b via the DSLs. The customer equipment 175a and 175b is located at customer premises of one or more customers and/or subscribers.

The transitional device 110 provides for traffic to pass between the DSLAM 170 and the ATM cloud 120, or between the DSLAM 170 and the Ethernet cloud 130. The transitional device 110 further includes a provisioning table 180 including at least one memory device for storing provisioning information associated with customer equipment 175a and 175b. The provisioning table 190 includes provisioning information that identifies the customer equipment 175a, 175b on each of the ATM cloud 120 and the Ethernet cloud 130. In a particular embodiment, each of the customer equipment 175a is identified by a VPI/VCI pair on the ATM cloud 120, and by an S-tag/C-tag pair on the Ethernet cloud 130. For example, a VPI identifies the DSLAM 170 on the ATM cloud 120 and the S-tag identifies the DSLAM 170 on the Ethernet cloud 130. A VCI identifies a particular DSL line associated with customer equipment 175a on the ATM cloud 120 and the C-tag identifies the particular DSL line associated with customer equipment 175a on the Ethernet cloud 130. The system 100 may further include a session manager 190 in communication with the ATM cloud 120 and the Ethernet cloud 130. The session manager 190 initiates and manages services provided to the customer equipment 175a and 175b.

In an example operation of system 100, DLSAM 170 is physically terminated to the ATM interface port 160 and is provisioned with a virtual path identifier (VPI) that identifies the DSLAM 170 on the ATM cloud 120. In the example illustrated in FIG. 1, DSLAM 170 is provisioned with a VPI of 11. The VPI is cross-connected through the transitional device 110 to the ATM egress port 140 towards the ATM cloud 120 and the session manager 190. The VPI is also cross-connected through the transitional device 110 to the Ethernet egress port 150 with an S-tag VLAN identifier towards the Ethernet cloud 130 and session manager 190. The S-tag identifies the DLSAM 170 on the Ethernet cloud 130. VCIs are assigned to each of the DSL lines coupling each of the customer equipment 175a and 175b to the DSLAM 170. In the illustrated embodiment, a VCI between 1 and 672 can be used to identify each of the DSL lines coupled to the DSLAM 170. At the ATM interface port 160, VCIs within the VPI are either cross-connected to the ATM egress port 140 or cross-connected to the Ethernet egress port 150 depending on an exclusion principle. In accordance with an embodiment of the invention, the exclusion principle is assigned by a service provider. The exclusion principle specifies VCIs that are to be excluded from being assigned to the Ethernet egress port 150, and are instead to be assigned to the ATM egress port 140. In the example described herein, the exclusion principle is assigned such that all VCIs except for VCI 37 and VCI 42 are assigned to the Ethernet egress port 150.

The VCIs cross-connected to the Ethernet egress port 150 are cross-connected to Ethernet C-tag VLANS by the transitioning device 110 during an automated provisioning procedure. In a particular embodiment, the VCIs are cross-connected to Ethernet C-tag VLANS on a one-to-one basis. For example, VCI=33 within VPI=11 is assigned a C-tag=33. The C-tag identifies a DSL line of DSLAM 170 within the Ethernet cloud 130. However, the VPI and S-tag values identifying the DSLAM 170 may be different values. At the end of the automated provisioning procedure each DSL line associated with each of customer equipment 175a and 175b of the DSLAM 170 is assigned a VPI/VCI pair as an identifier on DSLAM 170, and an S-tag/C-tag pair as an identifier on the Ethernet cloud 130. In at least one embodiment, the VPI/VCI and S-tag/C-tag assignments are stored in the provisioning table 180. As a result of the automated ATM to Ethernet provisioning procedure, the customer equipment 175a and 175b is operable to communicate with either the Ethernet cloud 130 or the ATM cloud 120.

Although the presently illustrated embodiments include customer equipment 175a and 175b, it should be understood that other types of subscriber equipment can be used in other embodiments. In addition, although the presently illustrated embodiments include an ATM cloud 120, it should be understood that the principles described herein are applicable to other types of cell-switched networks. Further, although the presently illustrated embodiments include an Ethernet cloud 130, it should be understood that the principles described herein are applicable to other types of packet-switched networks.

Figure 2A:
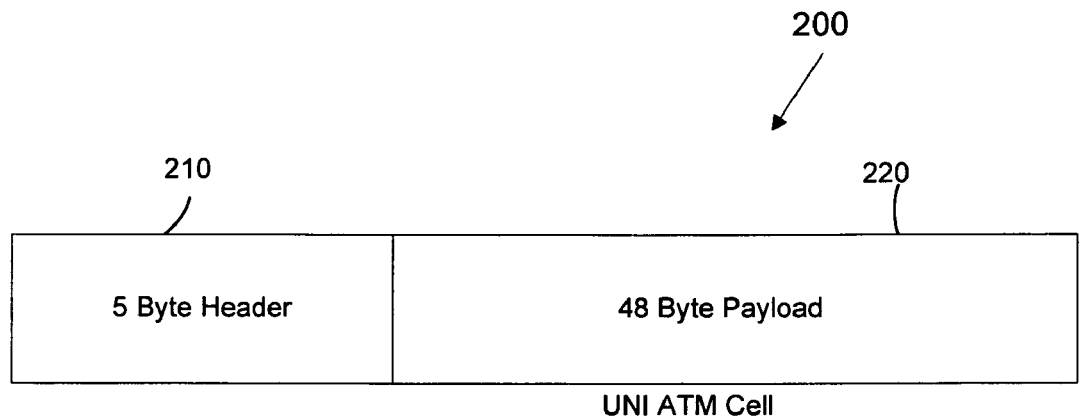
FIG. 2A illustrates an embodiment of an ATM cell for a user network interface (UNI) connection.
Figure 2B:
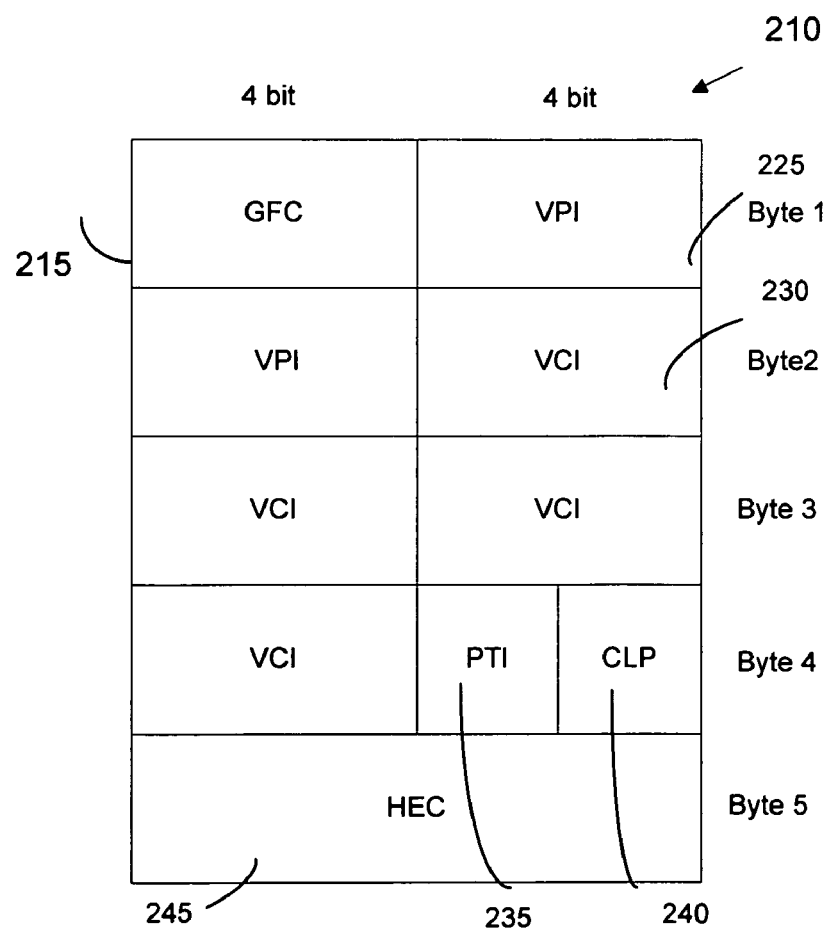
FIG. 2B illustrates an embodiment of a header of the ATM cell of FIG. 2A.

FIG. 2A illustrates an embodiment of an ATM cell 200 for a user network interface (UNI) connection. In various embodiments, ATM cells carried on the ATM cloud 120 are formatted in accordance with ATM cell 200. The ATM cell 200 includes a 5-byte header 210 and a 48-byte payload 220. The payload 220 includes the information payload of the ATM cell 200. FIG 2B illustrates an embodiment of the header 220 of the ATM cell 200 of FIG. 2A. The header 220 includes a 4-bit of generic flow control (GFC) field 215 that may optionally be used to provide local functions, such as identifying multiple stations that share a single ATM interface. The GFC field 215 is typically not used and is set to a default value. The header further includes an 8-bit virtual path identifier (VPI) field 225, and a virtual channel identifier (VCI) field 230. The header 200 further includes 3-bit payload type indicator (PTI) field 235. The first bit of the PTI field 235 indicates whether the cell contains user data or control data. If the cell contains user data, the second bit indicates congestion, and the third bit indicates whether the cell 200 is the last in a series of cells that represent a single ATM Adaptation Layer 5 (AAL5) frame. The header 200 further includes a 1-bit congestion loss priority (CLP) field 240 that indicates whether the cell 200 should be discarded if it encounters extreme congestion as it moves through the network, and an 8-bit header error control (HEC) field 245 that is a checksum calculated only on the header itself. Although embodiments of the present invention are illustrated using ATM cells, it should be understood that the principles described herein are applicable to other types of data cells used in cell-switched networks. In addition, although the illustrated embodiments describe the use of VPIs and VCIs in an ATM network, other types of path identifiers and channel identifiers maybe used in other embodiments.

Figure 3:
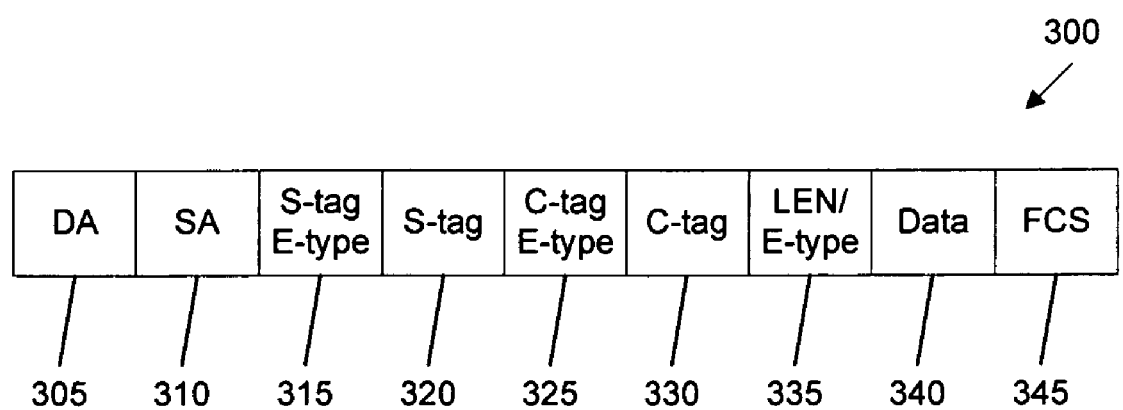
FIG. 3 illustrates an embodiment of a double-tagged Ethernet frame.

FIG. 3 illustrates an embodiment of a double-tagged Ethernet frame 300. The term "double-tagged" refers to the Ethernet frame 300 including both a S-tag and a C-tag. In various embodiments, Ethernet frames carried on the Ethernet cloud 130 are formatted in accordance with Ethernet frame 300. The Ethernet frame 300 includes a destination address field 305 identifying the destination address of the Ethernet frame 300, and a source address field 310 including the source address of the Ethernet frame 300. The Ethernet frame 300 further includes an S-tag E-type field 310 identifying an S-type protocol type, and an S-tag 320. The Ethernet frame 300 further includes a C-tag E-type field 325 identifying a C-type protocol type, and a C-tag 330. The Ethernet frame 300 also includes a LEN/E-type field 335 identifying a data protocol type, and a data field 340 including the payload data of the Ethernet frame 300. The Ethernet frame 300 further includes a frame checksum field 345 including a checksum for the Ethernet frame 300. Although embodiments of the present invention are illustrated using Ethernet frames, it should be understood that the principles described herein are applicable to other types of data packets used in packet-switched networks. In addition, although the illustrated embodiments describe the use of S-tags and C-tags in an Ethernet network, other types of service identifiers and customer identifiers may be used in other embodiments.

Figure 4:
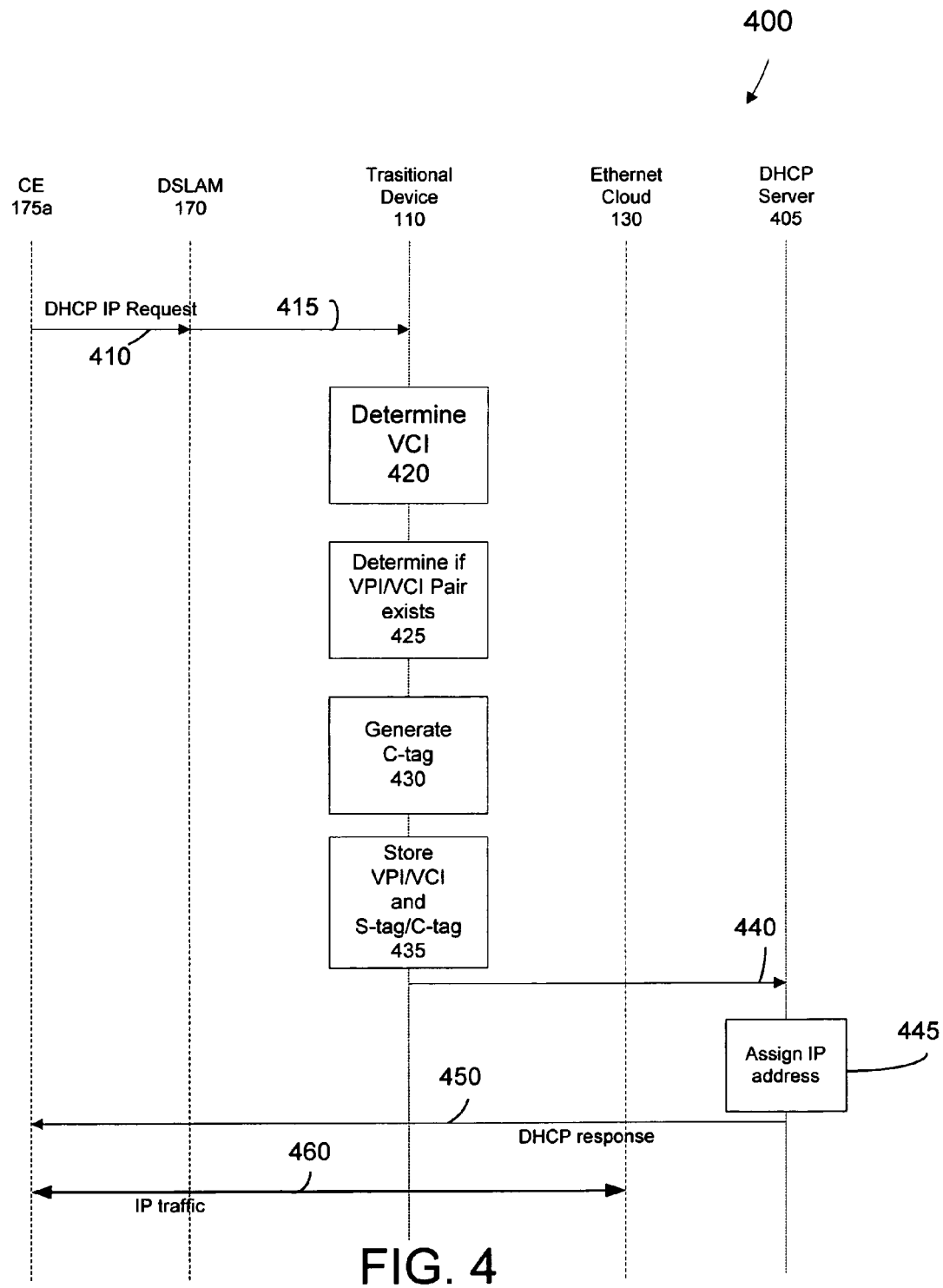
FIG. 4 illustrates an embodiment of a message flow for automatic ATM to Ethernet provisioning.

FIG. 4 illustrates an embodiment of a message flow 400 for automatic ATM to Ethernet provisioning. The illustration of FIG. 4 includes customer equipment 175a, DSLAM 110, transitional device 110, and Ethernet cloud 130, as provided in FIG. 1. The embodiment illustrated in FIG. 4 further includes a Dynamic Host Configuration Protocol (DHCP) server 405. The DHCP server receives DHCP Internet Protocol (IP) address requests from one or more network devices, assigns an IP address to the network device, and sends a response to the network devices including the assigned IP address. It should be understood that in other embodiments that other types of servers used to assign network addresses maybe used.

In the present embodiment, the transitional device 110 has provisioning table 180 that includes a path provisioning table. The path provisioning table includes VPIs that are provisioned within the ATM network and the corresponding S-tag VLAN to which they are provisioned. An example of a path provisioning table is illustrated by TABLE 1.

TABLE 1

| VPI | S-tag VLAN |
|-----|------------|
| 1   | 100        |
| 2   | 200        |
| 3   | 300        |
| 4   | 400        |
| 27  | 500        |

The provisioning table 180 further includes a channel provisioning table. The channel provisioning table includes a table of VPI/VCIs that are already provisioned in the system and the S-tag/C-tag to which the VPI/VCI are cross-connected. An example of a channel provisioning table is illustrated by TABLE 2.

TABLE 2

| VPI | VCI | S-tag | C-tag |
|-----|-----|-------|-------|
| 1   | 1   | 100   | 1     |
| 1   | 2   | 100   | 2     |
| 1   | 3   | 100   | 3     |
| 2   | 1   | 200   | 1     |
| 2   | 2   | 200   | 2     |
| 3   | 1   | 300   | 1     |
| 3   | 2   | 300   | 2     |
| 4   | 1   | 400   | 1     |
| 27  | 1   | 500   | 1     |

In the embodiment illustrated in FIG. 4, DSLAM 170 has been provisioned with a VPI=1 to identify the DSLAM 170 on the ATM cloud 120 and an S-tag=100 to identify the DSLAM 170 on the Ethernet cloud 130, as provided in FIG. 1. In accordance with the illustrated embodiment, the customer equipment 175a has been installed and is desired to be automatically provisioned for the Ethernet cloud 130. In step 410, customer equipment 175 sends a DHGP IP request addressed to the DHCP server 405. The DHCP IP request includes the VPI and VCI values associated with the customer equipment 175a. Although the present embodiment is described as using a DHCP IP request, it should be understood that other embodiments may use other types of network address requests. In the presently illustrated embodiment, the customer equipment 175a is provisioned with a VPI=1 and a VCI=4. In step 415, DLSAM 170 forwards the DHCP address to transitional device 110. In step 420, transitional device 110 receives the DHCP IP request and determines the VCI associated with the customer equipment 175a from the DHCP IP request. The transitional device 110 determines whether the particular VPI/VCI pair exists in the provisioning table 180 in step 425. If the VPI/VCI pair does not exist in the provisioning table 180, the transitional device 110 generates a C-tag associated with the customer equipment 175a by mapping the VCI to the C-tag in step 430. The C-tag identifies the customer equipment 175a on the Ethernet cloud 130. In a particular embodiment, the transitional device 110 performs a one-to-one mapping of the VCI to the C-tag such that the value of the C-tag is equal to the value of the S-tag. In the illustrated embodiment, the C-tag is given a value of 4 to correspond with the VCI=4. If the VPI/VCI pair already exists in the provisioning table 180, it is assumed that the customer equipment 175a has already been provisioned for the Ethernet cloud 130, and the DHCP IP request is passed on to the DHCP server.

Upon generating the C-tag, the transitional device 110 stores the VPI/VCI pair and S-tag/C-tag pair in the provisioning table 180 in step 435. An example of a channel provisioning table stored in the provisioning table 180 as a result of the automatic ATM to Ethernet provisioning of customer equipment 175a is illustrated by TABLE 3. For clarity the provisioning information associated with customer equipment 175a that is newly stored in the provisioning table 180 is shown as underlined within TABLE 3.

TABLE 3

| VPI | VCI | S-tag | C-tag |
|-----|-----|-------|-------|
| 1   | 1   | 100   | 1     |
| 1   | 2   | 100   | 2     |
| 1   | 3   | 100   | 3     |
| 1   | 4   | 100   | 4     |
| 2   | 1   | 200   | 1     |
| 2   | 2   | 200   | 2     |

TABLE 3-continued

| VPI | VCI | S-tag | C-tag |
|-----|-----|-------|-------|
| 3   | 1   | 300   | 1     |
| 3   | 2   | 300   | 2     |
| 4   | 1   | 400   | 1     |
| 27  | 1   | 500   | 1     |

In step 440, the transitional device 110 forwards the DHCP IP request to the DHCP server 405 in a double-tagged Ethernet frame including the S-tag/C-tag pair identifying the customer equipment 175a on the Ethernet cloud 130. The DHCP server 405 assigns the customer equipment 175 an IP address in step 445. In step 450, the DHCP server 405 sends a DHCP response containing the assigned IP address to the customer equipment 175a. In step 460, traffic comprising double-tagged Ethernet frames can be passed between customer equipment 175a and the Ethernet cloud 130 through the transitional device 110 as a result of the automatic provisioning of customer equipment 175a. In addition, traffic between the customer equipment 175a and the ATM cloud 120 is passed through the transitional device 110. As a result of the automated ATM to Ethernet provisioning procedure, the customer equipment 175a is operable to communicate with the Ethernet cloud 130 as well as the ATM cloud 120.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM, compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. An automated computer implemented method for provisioning a subscriber device for use on a packet-switched network, the comprising:

receiving, via a cell-switched network, a network address request from a subscriber device at a network communications device, the network address request including at least one data cell including a channel identifier associated with the subscriber device, the channel identifier identifying the subscriber device for the cell-switched network, wherein the at least one data cell further includes a path identifier, the path identifier identifying a Digital Subscriber Line Access Multiplexer (DSLAM) for the cell-switched network, said DSLAM associated with and coupled to the subscriber device;

determining, by the network communications device, the channel identifier from the network address request;

determining, by the network communications device, whether the channel identifier currently exists in a provisioning table used for provisioning the subscriber device for a packet-switched network;

in response to a determination that the channel identifier does not currently exists in the provisioning table, determining whether the channel identifier is excluded from being assigned to an egress port of the network communication device in communication with the packet-switched network based on an exclusion principle assigned by a service provider:

in response to a determination that the channel identifier does not currently exists in the provisioning table and is not excluded from being assigned to the egress port of the network communication device in communication with the packet-switched network generating, by the network communications device, a customer tag for the subscriber device using the channel identifier, the customer tag identifying the subscriber device for the packet-switched network;

storing, by the network communications device, the channel identifier and the customer tag in the provisioning table;

storing the path identifier and a service tag in the provisioning table, the service tag identifying said DSLAM for the packet-switched network; and forwarding, by the network communications device, the network address request to a network address assigning device configured to assign a network address to the subscriber device.

2. The method of claim 1, wherein generating the customer tag includes setting a value of the customer tag equal to a value of the channel identifier.

3. The method of claim 1, wherein the network address request includes a Dynamic Host Configuration Protocol (DHCP) Internet Protocol (IP) request.

4. The method of claim 1, wherein the channel identifier includes a virtual channel identifier (VCI).

5. The method of claim 1, wherein the customer tag includes an Ethernet c-tag.

6. The method of claim 1, wherein the cell-switched network includes an asynchronous transfer mode (ATM) network.

7. The method of claim 1, wherein the packet-switched network includes an Ethernet network.

8. The method of claim 1 further comprising initiating and managing services provided to the subscriber device via a session manager, the session manager in communication with packet-switched network, the cell-switched network, and the network communications device.

9. The method of claim 1 wherein the path identifier connects the DSLAM to the network communications device and a session manager via the cell-switched network.

10. The method of claim 1 wherein the path identifier connects the DSLAM to the network communications device, then using, by the network communications device, the service tag to connect the DSLAM to a session manager via the packet-switched network.

11. An apparatus for network service provisioning, the apparatus comprising:
at least one processor; and
at least one memory device for storing a provisioning table;
the at least one processor configured to:
receive a network address request from a subscriber device, the network address request including at least one data cell including a channel identifier associated with the subscriber device, the channel identifier identifying the subscriber device for a cell-switched network, wherein the at least one data cell further includes a path identifier, the path identifier identifying a Digital Subscriber Line Access Multiplexer (DSLAM) for the cell-switched network, said DSLAM associated with and coupled to the subscriber device;
determine the channel identifier from the network address request;
determine whether the channel identifier currently exists in a provisioning table used for provisioning the subscriber device for a packet-switched network;
determine whether the channel identifier is excluded from being assigned to an egress port of the network communication device in communication with the packet-switched network based on an exclusion principle assigned by a service provider in response to a determination that the channel identifier does not currently exists in the provisioning table;
generate a customer tag for the subscriber device using the channel identifier, the customer tag identifying the subscriber device for the packet-switched network in response to a determination that the channel identifier does not currently exists in the provisioning table and is not excluded from being assigned to the egress port of the network communication device in communication with the packet-switched network;
store the channel identifier and the customer tag in the provisioning table for use in provisioning the subscriber device for the packet-switched network; and
store the path identifier and a service tag in the provisioning table, the service tag identifying said DSLAM for the packet-switched network.

12. The apparatus of claim 11, wherein generating the customer tag includes setting a value of the customer tag equal to a value of the channel identifier.

13. The apparatus of claim 11, wherein the channel identifier includes a virtual channel identifier (VCI).

14. The apparatus of claim 11, wherein the customer tag includes an Ethernet c-tag.

15. A computer usable program product in a non-transitory computer readable medium storing computer executable instructions for network service provisioning that, when executed, cause at least one processor to:
receive a network address request from a subscriber device, the network address request including at least one data cell including a channel identifier associated with the subscriber device, the channel identifier identifying the subscriber device for a cell-switched network, wherein the at least one data cell further includes a path identifier, the path identifier identifying a Digital Subscriber Line Access Multiplexer (DSLAM) for the cell-switched network, said DSLAM associated with and coupled to the subscriber device;
determine the channel identifier from the network address request;
determine whether the channel identifier currently exists in a provisioning table used for provisioning the subscriber device for a packet-switched network;
determine whether the channel identifier is excluded from being assigned to an egress port of the network communication device in communication with the packet-switched network based on an exclusion principle assigned by a service provider in response to a determination that the channel identifier does not currently exists in the provisioning table;
generate a customer tag for the subscriber device using the channel identifier, the customer tag identifying the subscriber device for a Packet of -switched network in response to a determination that the channel identifier does not currently exists in the provisioning table and is not excluded from being assigned to the egress port of the network communication device in communication with the packet-switched network;
store the channel identifier and the customer tag in the provisioning table for use in provisioning the subscriber device for the packet-switched network; and
store the path identifier and a service tag in the provisioning table, the service tag identifying said DSLAM for the packet-switched network.

16. The computer usable program product of claim 15, wherein generating the customer tag includes setting a value of the customer tag equal to a value of the channel identifier.

17. The computer usable program product of claim 15, wherein the channel identifier includes a virtual channel identifier (VCI).

18. The computer usable program product of claim 15, wherein the customer tag includes an Ethernet c-tag.

* * * * *